United States Patent [19]

Volk, Sr. et al.

[11] Patent Number: 4,833,377
[45] Date of Patent: May 23, 1989

[54] CURRENT LEAKAGE REDUCTION CIRCUIT

[75] Inventors: Joseph A. Volk, Sr., Chesterfield; Joseph A. Volk, Jr., Creve Coeur, both of Mo.

[73] Assignee: Beta Raven Inc., Earth City, Mo.

[21] Appl. No.: 138,370

[22] Filed: Dec. 28, 1987

[51] Int. Cl.$^4$ ................................................ H02P 7/36
[52] U.S. Cl. ...................................... 318/747; 318/476; 388/902
[58] Field of Search ........................... 318/65, 49–56, 318/339–340, 342–344, 345, 434, 474–476, 495, 499; 361/55–57, 88–91, 107

[56] References Cited

U.S. PATENT DOCUMENTS

| | | | |
|---|---|---|---|
| 3,921,012 | 11/1975 | Marshall, III | 307/228 |
| 3,921,048 | 11/1975 | Padgitt | 318/480 |
| 4,237,425 | 12/1980 | Spiegel | 330/278 |
| 4,698,721 | 10/1987 | Warren | 361/55 |

Primary Examiner—William M. Shoop, Jr.
Assistant Examiner—David S. Martin
Attorney, Agent, or Firm—Rogers, Howell, Moore & Haferkamp

[57] ABSTRACT

An offset current which is 180° out of phase with the leakage current for a motorized bed circuit is created through the use of an additional transformer winding and series resistor which is connected between the neutral conductor and ground conductor. As the circuit is connected in the reverse polarity condition for testing to UL standards, the offset current is injected into the ground conductor which cancels out a portion of the leakage current from the motors to thereby bring it within testing standards. In the normal connection condition, the injected offset current is additive to the leakage current, although the normal leakage current is much less than the reverse polarity connection leakage current so that the overall leakage current in the normal connection condition remains within test standards.

10 Claims, 1 Drawing Sheet

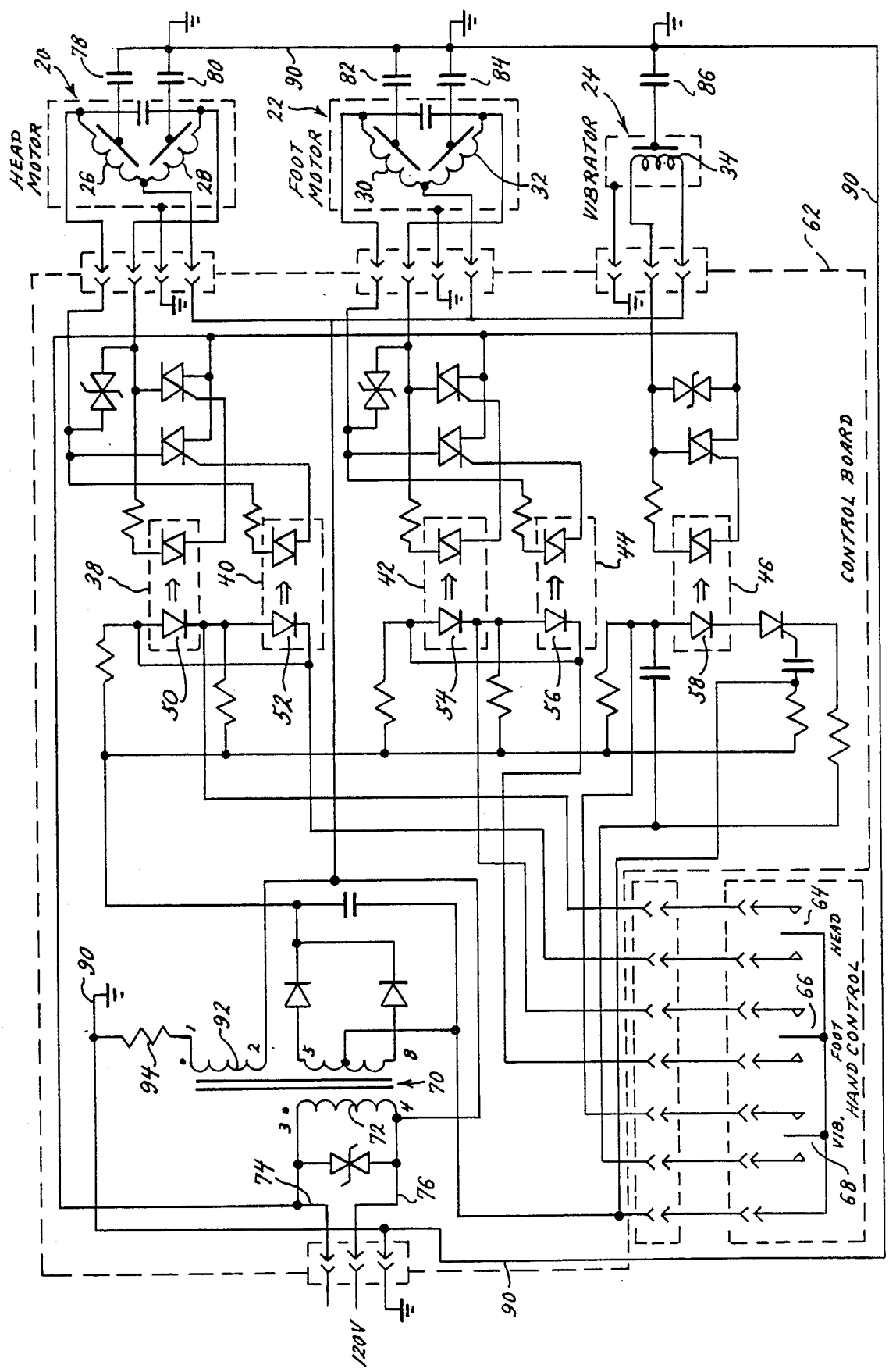

CURRENT LEAKAGE REDUCTION CIRCUIT

BACKGROUND AND SUMMARY OF THE INVENTION

Motorized beds have been used for years as a convenience for hospital patients and others to position various portions of the bed into a configuration which provides maximum comfort. A motorized bed also makes it relatively easy for a user to change the position of the bed as frequently as desired.

One of the concerns in making a motorized bed is protecting a user from any chance of shock or other hazard due to electrical leakage currents. Accordingly, safety standards have been established by Underwriters Laboratories which include testing the various motors and controls used in motorized beds for maximum leakage current under various conditions. One of these conditions is a reverse polarity connection. Typically, a motorized bed will have an electrically "hot" conductor which carries the A-C power to operate the motors, a neutral conductor, and a ground or equipment ground conductor. In the reverse polarity connection test, the hot and neutral conductors are reverse connected such that the electrically hot line from the incoming power is connected to the neutral of the motorized bed circuit and, similarly, the neutral conductor from the power supply is connected to the conductor which is ordinarily connected to the hot side of the power supply. In this reverse polarity connection, the UL 544 standard is for a maximum of 100 microamps of leakage current.

The motors typically used in previous motorized bed circuits were 16 slot stator motors which had no trouble meeting this reverse polarity leakage current standard. However, recently, some manufacturers have converted to a 24 slot stator motor. With the 24 slot motor there is not only a savings in cost, but also an increased motor torque available which permits its use in a greater number of bed designs and thereby serves to reduce inventory, and also results in a higher speed operation for some directions of bed movement. Unfortunately, with the increased number of stator slots, there is an increased leakage current induced in the reverse polarity condition such that when multiple motors are energized the UL 544 standard of 100 microamps is not met as up to 125 microamps of leakage current has been detected in some tests. While there have been some circuit modifications suggested to meet this standard, they are not particularly desirable. One suggested modification involves the use of a relay control which interlocks the motors such that only one motor is energized at any particular time. In a bed with multiple motions, this interlocking reduces the facility of movement and adjustability thereby rendering it more time-consuming and less convenient for a user to adjust the bed position. Still another approach has been to utilize relay contacts to disconnect the motor windings upon reverse polarity connection. However, this is also undesirable in that it inordinately increases the cost involved for the control.

To solve these and other problems, the inventors herein have succeeded in designing and developing a simple circuit for injecting an offset current under the reverse polarity connection conditions which is substantially 180° out of phase from the leakage current such that it offsets a portion of the induced leakage current and reduces it to a value below the 100 microamp maximum. Typically, a control transformer is included in the control portion of a motorized bed as it is desired to operate the control circuit and hand control at a voltage much lower than the voltage used to operate the motors themselves. Taking advantage of this transformer, the inventors have utilized a transformer with an additional winding on the primary side, this auxiliary winding being wound for reverse polarity to the motor windings. The auxiliary transformer winding is then connected between neutral and ground with a series resistor such that as the neutral conductor is connected to the hot side of the power supply, an offset current is injected through the series resistor into the ground conductor. As this injected offset current is 180° out of phase, it serves to cancel out and reduce the leakage current to a value below the 100 microamp standard.

Although this same transformer winding and series resistor serves to inject a leakage current under normal connections, which because of its polarity is in phase with the induced leakage current, its value of a nominal 30 microamps when added to the approximately 20 microamps of leakage current experienced under normal connections totals only 50 microamps, this 50 microamps of leakage being still well below the 100 microamps standard. Thus, the net effect of adding this auxiliary transformer winding and series resistor is to reduce the reverse polarity leakage current from approximately 125 to a value just below the 100 microamp standard of UL 544 without increasing the leakage current for the normal connection condition beyond the 100 microamp standard. As a result, the inventors have succeeded in making a circuit change of nominal cost which brings the whole circuit back within UL 544 standard when used with 24 slot stator motors without limiting the overall operation of the bed as in other suggested circuit modifications designed to meet the UL 544 standard.

While the principal advantages and features of the invention have been disclosed and described above, a fuller understanding thereof may be attained by referring to the drawing and description of the preferred embodiment which follow.

BRIEF DESCRIPTION OF THE DRAWING

The drawing is an electrical schematic of a motorized bed and control with the current leak reduction circuit shown therein.

DETAILED DESCRIPTION OF THE PREFERRED EMBODIMENT

As shown in the figure, a motorized bed typically utilizes three motors 20, 22, 24, two of which have a pair of windings 26, 28, 30, and 32; while one motor 24 has a single winding 34. These windings are switched on and off by two paired triac circuits 38, 40 and 42, 44, for the reversing directions available with each of the reversing motors 20, 22, and a single triac circuit 46 for the non-reversing motor 24. As is shown in the drawing, each triac switching circuit 38-46 includes a photosensitive triac which is controlled by a corresponding LED identified as 50, 22, 54, 56, and 58 in a standard low voltage control power circuit 62 as shown enclosed within a dotted line in the lower portion of the figure. These LEDs 50-58 are operated by one of three hand control switches 64, 66 and 68 which enable a person lying in bed to desirably move various portions of the bed to configure it as is most comfortable. A transformer 70 is typically included in the standard low voltage control circuit 62 which reduces the voltage such that the control operates on a much lower voltage than the power which is used to run the motors 20, 22, and 24. The primary winding 72 of transformer 70 is connected between the "hot" conductor 74 and the neutral conductor 76, as is known in the art.

The above described portions of the typical motorized bed circuit are well known in the art as evidenced by the prior patented design mentioned above.

The present invention is directed to reducing leakage current in the reverse polarity connection condition. To show this condition schematically, a plurality of capacitors 78, 80, 82, 84, and 86 are shown connected in circuit with the stator windings 26, 28, 30, 32, and 34 to represent the capacitive reactance which couples the stator windings to the ground conductor 90 through the grounded motor stator. The stator windings 26–34 are connected in circuit between the neutral conductor 76 and the ground conductor 90. As can be appreciated by anyone of ordinary skill in the art, in the reverse polarity connection condition, there is a maximum difference in potential between neutral conductor 76 and ground conductor 90 such that a maximum leakage current is induced across the stator windings and through the capacitive reactance schematically shown as capacitors 78–86. In the normal connection condition, it can be expected that the potential at the neutral conductor 76 and at the ground conductor 90 is nominally equal such that there is a minimal amount of leakage current induced through capacitive reactances 78–86. Thus, there is a greater need to induce an offset current for the reverse polarity connection than in the normal polarity connection. Accordingly, an auxiliary transformer winding 92 has been added to the primary side of transformer 70 and is wound and connected in a polarity that is additive of the stator windings 26–34 with a series resistor 94. It is noted that the transformer winding 92 is connected between the neutral conductor 76 and ground conductor 90 such that it induces a leakage current in the ground conductor 90 through series resistor 94.

In a preferred embodiment, the auxiliary winding 92 is rated at 140 volts A-C and series resistor 94 is a 3 meg ohm resistor which results in approximately 30 microamps of injected offset current. The phase of the injected offset current remains the same in both the reverse and normal connection conditions. However, the leakage current in the normal condition is 180° out of phase from that of the reverse polarity connection condition such that the injected offset current is intended to be 180° out of phase with the reverse connection leakage current to thereby reduce it but, unfortunately, it is in phase wit the normal polarity condition leakage current and is thus additive. Nevertheless, as the reverse polarity connection results in much greater leakage current, and the normal connection leakage current is so low, a transformer winding 92 and resistor 94 can be chosen which brings the reverse polarity leakage current just back into standard while adding a minimal amount of leakage current to the normal connection condition so that it remains within the 100 microamp UL 544 standard. With the circuit of the present invention, 24 slot stator motors can be used which provide the greater torque and operating speeds without violating the UL 544 standard and maintaining a safe design.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In an A-C circuit for operating at least one motor from an A-C source, said A-C source being comprised of hot, neutral, and ground conductors, said circuit having at least three conductors including at least one hot conductor, one neutral conductor and one ground conductor, said source hot, neutral or ground conductors being adapted for connection to the circuit hot, neutral, and ground conductors, respectively, the motor being connected to all three of said circuit conductors and having means to induce an undesired leakage current into the circuit ground conductor, the improvement comprising means to inject an offset current into the circuit ground conductor when the neutral and hot conductors of the circuit are reverse connected to the hot and neutral conductors, respectively, of the A-C source, said offset current being out of phase with the leakage current so that said offset current substantially cancels a portion of the leakage current.

2. The device of claim 1 wherein said offset current is approximately 180° out of phase with the leakage current.

3. The device of claim 1 wherein said offset current injection means comprises a transformer means and an impedance.

4. The device of claim 3 wherein said circuit includes a transformer for reducing the voltage, the transformer means comprising an auxiliary winding in said transformer, and the impedance comprising a resistor.

5. The device of claim 4 wherein said auxiliary winding is connected in series with the resistor between the neutral conductor and the ground conductor.

6. The device of claim 5 wherein said motor has at least one winding for connection in circuit between the hot conductor and the neutral conductor and other portions of said motor connected in circuit to the ground conductor, said means to induce the leakage current comprising a capacitive reactance between the winding and said other grounded portions.

7. The device of claim 6 wherein said auxiliary winding is connected in the opposite polarity as the motor winding.

8. The device of claim 7 wherein said circuit includes a plurality of motors, each motor having windings wound into a grounded motor stator, the leakage current being induced between said stator windings and the grounded stators.

9. In an A-C circuit for operating a plurality of motors from an A-C source, said A-C source and A-C circuit each being comprised of hot, neutral, and ground conductors , each motor having at least one winding wound into a stator, the winding being adapted for normal connection between the circuit hot conductor and the circuit neutral conductor, the stator being normally connected to the circuit ground conductor, said circuit hot, neutral, and ground conductors being adapted for connection to the hot, neutral, and ground conductors of the A-C source, the motors having means to induce an undesired A-C leakage current into the grounded stator when the circuit hot and neutral conductors are connected in reverse polarity to the neutral and hot conductors, respectively, of the A-C source, the improvement comprising means to inject an A-C offset current into the circuit ground conductor under said reversed polarity condition, said offset current being substantially 180° out of phase with the leakage current so that said leakage current is reduced thereby.

10. The device of claim 9 wherein said offset current injection means comprises a transformer winding and a series resistor, said transformer winding and resistor being connected in circuit between the neutral conductor and the ground conductor, and the transformer winding being of reverse polarity to the motor windings.

* * * * *